United States Patent
McCollough et al.

(10) Patent No.: US 6,755,402 B2
(45) Date of Patent: Jun. 29, 2004

(54) ISORAIL ELASTOMER ISOLATOR

(75) Inventors: Trevor J. McCollough, Minneapolis, MN (US); Richard L. Cellini, Burnsville, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,163

(22) Filed: Feb. 8, 2001

(65) Prior Publication Data

US 2002/0105125 A1 Aug. 8, 2002

(51) Int. Cl.$^7$ ................................................. F16F 1/36
(52) U.S. Cl. ................................. 267/141; 267/153
(58) Field of Search ............................... 267/103, 139, 267/140, 140.5, 141, 153, 292, 145; 248/603, 615, 632, 633

(56) References Cited

U.S. PATENT DOCUMENTS

| | | | |
|---|---|---|---|
| 1,452,035 A | * 4/1923 | Freeman | 248/615 |
| 3,507,123 A | * 4/1970 | Miura | 267/140 |
| 3,975,564 A | * 8/1976 | Jones | 428/174 |
| 4,059,254 A | 11/1977 | Fielding-Russell et al. | 267/140 |
| 4,420,135 A | * 12/1983 | Munz | 248/633 |
| 4,925,163 A | * 5/1990 | Wolf et al. | 267/153 |
| 4,936,539 A | * 6/1990 | Nangle | 248/633 |
| 5,184,799 A | * 2/1993 | Wolf et al. | 248/634 |
| 5,766,720 A | 6/1998 | Yamagishi et al. | 428/71 |
| 5,813,649 A | * 9/1998 | Peterson et al. | 248/618 |
| 5,904,010 A | * 5/1999 | Javid et al. | 52/167.7 |
| 6,221,930 B1 | * 4/2001 | Tada et al. | 521/155 |

\* cited by examiner

Primary Examiner—Jack Lavinder
Assistant Examiner—Bradley T. King

(57) ABSTRACT

An elastomer isolator mount that can provide both compressive support and shear support to enable the elastomer isolator mount to attenuate shock and vibration forces to an object carried by the elastomer isolator mount with the ratio of compressive support to shear support controllable by the diameter of a plurality of angled holes in relation to width of a top support surface and the dynamic response characteristics of the elastomer isolator mount further controllable by selecting the shape of the sidewalls of the elastomer isolator mount. A plurality of elastomer isolator mounts can be further arranged in a group to provide a support platform for an object.

14 Claims, 2 Drawing Sheets

ISORAIL ELASTOMER ISOLATOR

FIELD OF THE INVENTION

This invention relates to shock isolators and, more specifically, to a rail type shock isolator that can provide shear support while minimizing the direct compressive support path through the isolator.

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing.

The present invention provides an elastomeric isolator that can be used as a mount for housing, on other objects, where the axial offset compressive support for the housing, and the compressive support in relation to the shear support can be preselected by selection of the diameter of a plurality of angled holes extending through the elastomer isolator mount. The present invention does not require pairing with other elastomeric isolators so a single elastomeric isolator can be placed beneath a housing to provide static support for the housing through an axial offset compressive axis while at the same time allowing the elastomeric isolator to retain the necessary dynamic attenuation characteristics to thereby effectively reduce shock and vibration to the housing. However, if desired a set of elastomer isolator mounts can be grouped or arranged in end-to-end relationship to provide a platform for supporting an article in a condition wherein the shock and vibration forces are attenuated by the dynamic characteristics of the elongated elastomer isolator mount.

SUMMARY OF THE INVENTION

Briefly, the invention comprises an elastomer isolator mount that can provide both compressive support and shear support to enable the elastomer isolator mount to attenuate shock and vibration forces to an object carried by the elastomer isolator mount with the ratio of compressive support to shear support controllable by the diameter of a plurality of angled holes in relation to the width of a top support surface and the dynamic response characteristics of the elastomer isolator mount further controllable by selecting the shape of the sidewalls of the elastomer isolator mount. A plurality of elastomer isolator mounts can be further arranged in a group to provide a support platform for an object.

DESCRIPTION OF THE PREFERRED EMBODIMENT

Figure 1:
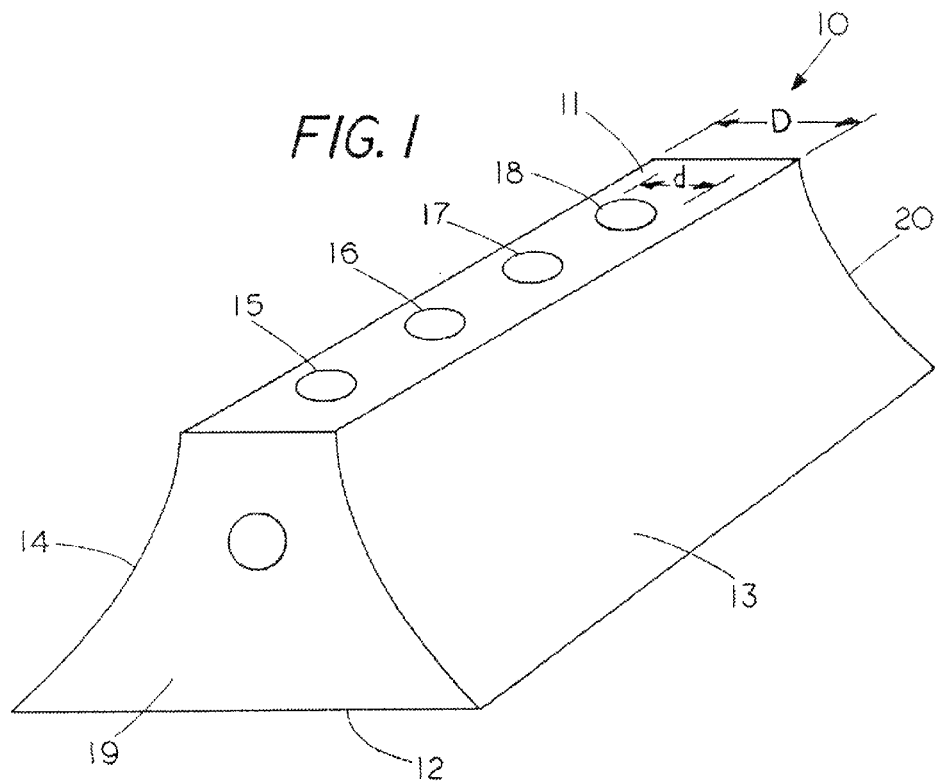
FIG. 1 is a perspective view of an elongated isolator rail mount for providing both compression support and shear support to an object.

FIG. 1 shows an elongated rail mount 10 that is an elastomer isolator for providing both compression support and shear support to an object. Elongated rail mount 10 is formed from an elastomer to create a one-piece elastomer isolator mount. Rail mount 10 has a bottom support surface 12 and a top support surface 11. A first concave shaped sidewall 13 connects one side of bottom support surface 12 to one side of top support surface 11 and a second concave shaped sidewall 14 connects an opposite side of bottom support surface 12 to the opposite side of top support surface 11. A plurality of holes 15, 16, 17 and 18 extend through the top support surface 11.

Figure 2:
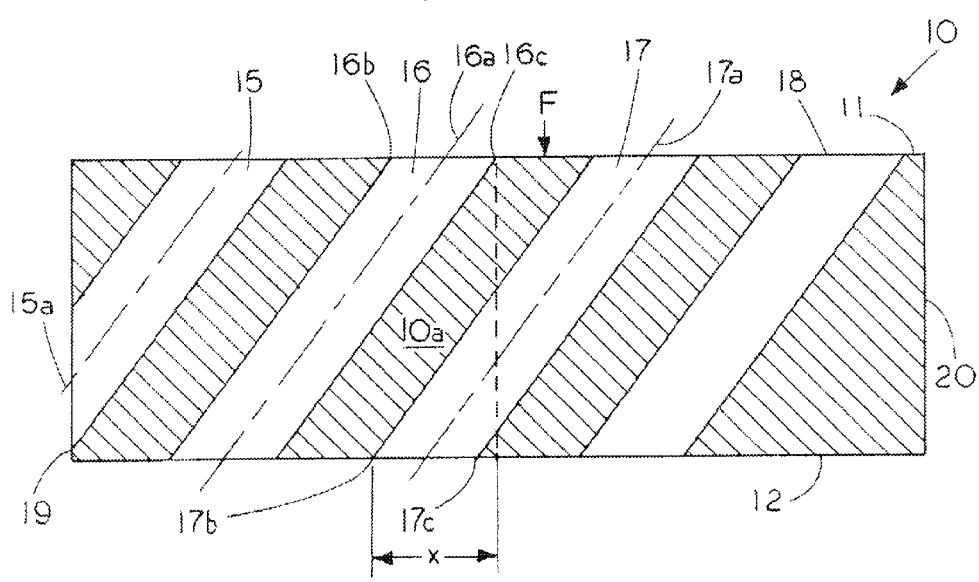
FIG. 2 is a sectional view of the elongated rail mount of FIG. 1.

FIG. 2 shows a cross sectional side view of rail mount 10 along a plane extending perpendicular to bottom support surface 12 and top support surface 11. Each of the plurality of holes 15, 16, 17 and 18 have a central axis which is positioned at an acute angle with respect to the top support surface 11, the bottom support surface 12 or both. For example, hole 16 has an acutely angled central axis 16a and hole 17 has an acutely angled central axis 17a. Hole 16 extends through top support surface 11 and bottom support surface 12. Similarly, hole 17 extends through top support surface 11 and bottom support surface 12. The sidewall of hole 17 has a leading element, which penetrates surface 12, at 17b and a trailing element which penetrates surface 12 at 17c. Sidewall of hole 16 has a similar leading element which penetrates the top support surface at 16b and a trailing element which penetrates top support surface at 16c. The positioning of the holes at an acute angle with respect to the bottom support surface 12 places a portion of the elastomer isolator mount 10 in a shear condition. That is, a force F on top support surface 11 in the region proximate each of the holes cannot be entirely supported in the compressive mode. For example, the trailing element end 16c and the leading element end 17b form the opposite corners of an elastomer parallelogram identified by 10a.

In the embodiment shown, a compressive force, indicated by F, can not be comparatively supported by elastomer isolator mount 10 in the region of the holes 16 and 17 since the material 10a cantilevers outward thereby placing a portion of the elastomer isolator mount in a shear condition. Thus if x is equal or greater than zero the elastic mount provides shear support proximate the hole region.

If the diameter of the holes "d" is less than the width of the top support surface "D" a portion of the elastomer isolator mount 10 is in compressive mode and a portion of the elastomer isolator mount is in a shear mode. By varying the width of the holes "d" in relation to the width of the top support surface "D" the amount of compressive support can be increased or decreased. For example if "D" is large in comparison to "d" there is more compressive support than if "D" and "d" are equal in size.

A further feature of the elastomer isolator mount 10 is that the dynamic response characteristics of the elastomer isolator mount 10 can be varied by altering the shape of the side walls. That is, a concave sidewall provides a first dynamic response characteristic for damping of shock and vibration and a sidewall of a different shape provides a second different dynamic response characteristic damping of shock and vibration. Consequently, not only can the amount of compressive resistance of the elastomer isolator mount in relation to the shear support be varied the dynamic response characteristics of the elastomer isolator mount can be varied independently by controlling the shape of the sidewalls as well as the amount of materials in the side walls. This feature allows one to maintain the same compressive support of the elastomer while changing the dynamic response characteristics of the elastomer isolator mount.

Figure 3:
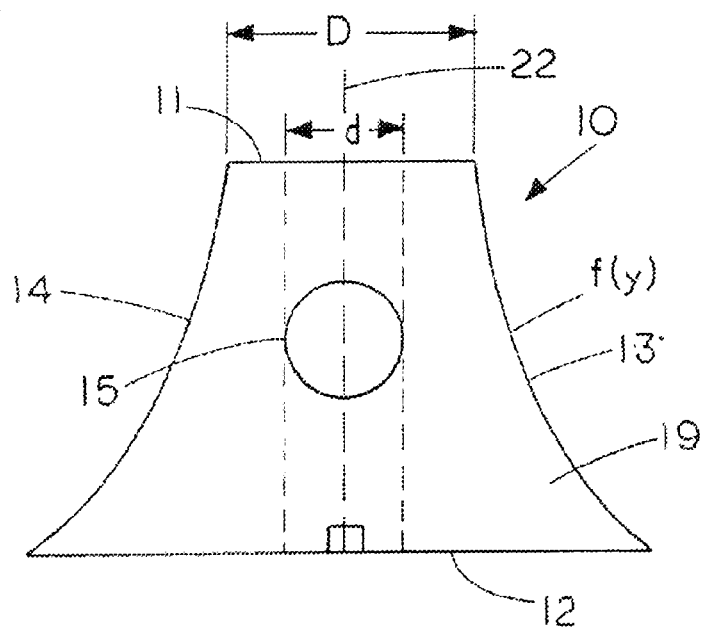
FIG. 3 is an end view of the elongated rail mount of FIG. 1.

FIG. 3 shows an end view of elongated elastomer isolator mount 10 with numeral 22 identifying a plane extending perpendicular to bottom support surface 12 and perpendicularly through top support surface 11. The side surface 13 is shown as concave as well as side surface 14. The distance "d" is shown as considerable less than the distance "D" of the top support surface 11 thereby engaging the region laterally of the holes to provide compressive support. In the end view hole 15 extends through sidewall 15 with the hole 15 having the shape of an ellipse as the axis 15 (FIG. 2) extends at an angle to end wall 19.

Figure 4:
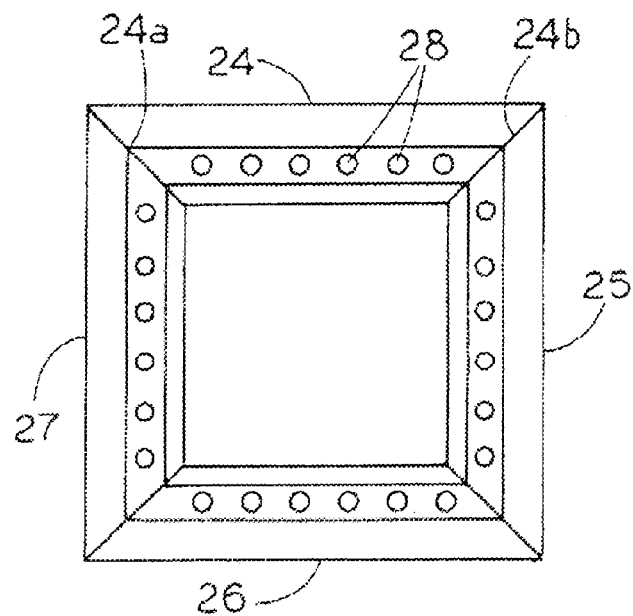
FIG. 4 is a top view of four elongated rail mounts arranged in a square to produce a support platform for supporting an object in both shear and compression.

FIG. 4 illustrates how a plurality of elastomer isolator mounts 24, 25, 26 and 27 can be grouped together to from a platform support for an article. In the embodiments shown the elastomer rail 25 has angled ends 24a and 24b which mate up with similarly angled ends on adjacent rail mounts 25 and 27 to form part of a square platform support for an objet. While the elastomer isolator mounts are grouped in an end-to-end relationship to provide platform like support other arrangements, such as side by side, can be used. In addition, by varying the number of elastomer isolator mounts as well as the size of the openings in relation to width of support surface 11 the ratio of compressive support to shear support can be controlled to allow tuning the elastomer to a specific application.

The invention includes a method of making an elastomer for supporting an objet in both compression and shear comprising the steps of: forming an elongated elastomer 10 having a top support surface 11 and a bottom support surface 12 and forming a plurality of holes 15, 16, 17 and 18 though the elongated elastomer 10 with the plurality of holes positioned at an acute angle with respect to a line extending in a normal direction from bottom support surface 12 to enable a portion of the elastomer body surrounding each of the holes to be maintained in a cantilevered condition so as to shear rather than compress when a force is applied to the supported object.

In the step of forming the plurality of holes, holes 15, 16, 17, and 18 are formed along a plane 22 extending normal to the bottom support surface 12 and with a central axis, for example, axis 16a and axis 17a are parallel with each other and with a central axis of each of the plurality of other holes in the elastomer isolator mount 10.

By forming a preselected shape to sidewalls 13 and 14, which connect the top support surface 11 to the bottom support surface 12 one can control the dynamic response characteristics of the elastomer without altering the amount of compressive support.

In order to provide compressive support for articles larger than the elastomer isolator mount the present invention includes the method of making the elastomers in groupings with one grouping where at least three elastomer are arranged in an end-to-end condition to provide a platform support for a large article. FIG. 4 illustrates when the elastomer isolator mounts 24, 25 26 and 27 are arranged in an end-to-end relationship to form a square platform.

The present invention further includes the method of supporting a static weight at least partially in a shear mode and partially in a compressive mode by forming an elongated elastomer body 10 having a top support surface 11 and a bottom support surface 12 with one of the support surfaces larger than the other. By forming a plurality of openings 15, 16, 17 and 18 through elongated elastomer body 10 with each of the plurality of openings having a central axis with each of the central axis forming an acute angle with the bottom support surface the amount of compressive support can be controlled.

In the step of forming the plurality of openings each of the central axis of the openings can be positioned parallel to each other with the top support surface 11 parallel to the bottom support surface 12 so that when the openings 15, 16, 17 and 18 extend through each of the top support surface 11 and the bottom support surface 12 they reduce the compressive support which would normally be provided by the rail mount 10.

By forming nonlinear sidewalls between top support surface 11 and bottom support surface 12 as well altering the shape of the non-linear sidewalls one can change a dynamic response characteristics of the elastomer isolator mount without changing the compressive support since the elastomer material in the side wall lateral of the top surface holes has little if any effect on the compressive support of the elastomer isolator mount 10

As a further feature of the invention the step of angle cutting an end 24a and 24b of each of at least three body members enable the at least three body members to be arranged to form a support platform in a end-to-end relationship. In the preferred embodiment the step of forming each of the openings with circular cross sections provides a convenient way to reduce the compressive support of a solid elastomer isolator mount.

We claim:

1. An elongated elastomeric isolator comprising:

an elongated body of elastomer, said elongated elastomer having a top support surface and a bottom support surface with said top support surface positioned above said bottom support surface so that a line perpendicular to said bottom support surface extends through said top support surface;

a first side wall connecting said top support surface to said bottom support surface;

a second side wall connecting said top support surface to said bottom support surface, said first side wall and said second side wall each having a concave shape; and a plurality of holes extending through said elongated elastomer, at least a portion of the plurality of holes angularly extending from the top support surface to said bottom support surface, each of said holes having a central axis with said central axis positioned at an acute angle with respect to said bottom support surface to thereby place a portion of the elastomer in a shear condition.

2. The elongated elastomer isolator of claim 1 wherein the holes are circular.

3. The elongated elastomer isolator of claim 1 wherein each of the holes have a side wall with the side walls of each hole being parallel to a side wall of an adjacent hole.

4. The elongated elastomer isolator of claim 1 wherein the top support surface is narrower than the bottom support surface.

5. The elongated elastomer isolator of claim 1 wherein each of the side walls have a curved surface.

6. The elongated elastomer isolator of claim 1 wherein the elongated body of elastomer has an angle cut first end for laterally mating with an angle cut first end of a second elongated body member, the angle cut end of the elongated body of elastomer resulting in the first sidewall having a longer length than the second sidewall of the elongated body of elastomer.

7. The elongated elastomer isolator of claim 1 wherein the elongated body of elastomer has an angle cut first end and an angle cut second end for placing the elongated body of elastomer with at least one other angle cut elastomer body to provide platform support over an extended surface, the angle cut ends of the elongated body of elastomer resulting in the first sidewall having a longer length than the second sidewall of the elongated body of elastomer.

8. The elongated elastomer isolator of claim 1 wherein said top support surface and said bottom support surface are parallel to each other.

9. The elongated elastomer isolator of claim 1 wherein each of the axis of the holes in said elastomer are parallel to each other.

10. The elongated elastomer isolator of claim 1 wherein each of said plurality of holes has a sidewall with a leading element and a trailing element with the leading element of a sidewall of a first hole extending through said bottom support surface and the trailing element of the sidewall of an adjacent hole extending through a top support surface with said trailing edge of the adjacent hole laterally displaced with respect to the leading element of the first hole.

11. The elongated elastomer isolator of claim 1 including two additional elongated elastomers arranged in an end to end condition to provide a platform for supporting an article thereon.

12. A method of supporting a static weight at least partially in a shear mode and partially in a compressive mode comprising:

forming an elongated elastomer body having a top support surface and a bottom support surface with the top support surface being parallel to the bottom support surface;

forming non-linear sidewalls between said top support surface and said bottom support surface; and forming a plurality of openings having a uniform cross-section throughout said elongated elastomer body with each of said plurality of openings having a central axis with said central axis forming an acute angle with said bottom support surface to thereby place a portion of the elastomer around the hole in a cantilever condition and at least a portion of the openings extending angularly from the top support surface through the elastomer and out the bottom support surface, each of the central axis of the opening positioned parallel to each other.

13. The method of claim 12 including the step of angle cutting an end of each of at least three body members to enable at least three body members to be arranged to form a support platform.

14. A method of supporting a static weight at least partially in a shear mode and partially in a compressive mode comprising:

forming an elongated elastomer body having a top support surface parallel to a bottom support surface;

forming nonlinear sidewalls between said top support surface and said bottom support surface; and forming a plurality of openings through said elongated elastomer body with each of said plurality of openings having a central axis with said central axis forming an acute angle with said bottom support surface to thereby place a portion of the elastomer around the hole in a cantilever condition.

* * * * *